United States Patent [19]
Hosaka et al.

[11] 3,882,958
[45] May 13, 1975

[54] COLLISION SENSOR FOR MOTOR VEHICLE SAFETY DEVICE

[75] Inventors: Akio Hosaka; Kosaku Baba, both of Yokohama, Japan

[73] Assignee: Nissan Motor Company Limited, Yokohma City, Japan

[22] Filed: Nov. 21, 1972

[21] Appl. No.: 308,560

[30] Foreign Application Priority Data
Feb. 1, 1972  Japan.................................. 47-12824

[52] U.S. Cl.... 180/105 E; 200/61.45 M; 303/21 CE
[51] Int. Cl. ............................................. B60r 21/02
[58] Field of Search ................. 180/103, 105, 82 R; 280/150 AB; 303/21 C, 21 CE, 21 CF; 200/61.45 M

[56] References Cited
UNITED STATES PATENTS

| | | | |
|---|---|---|---|
| 3,454,838 | 7/1969 | Defain | 317/123 |
| 3,495,675 | 2/1970 | Hass et al. | 280/150 AB |
| 3,603,612 | 9/1971 | Hill et al. | 180/105 E |
| 3,650,575 | 3/1972 | Okamoto | 188/181 C |
| 3,717,731 | 2/1973 | Porter et al. | 200/61.45 M |
| 3,736,435 | 5/1973 | Runge et al. | 303/21 CG |

*Primary Examiner*—David Schonberg
*Assistant Examiner*—John P. Silverstrim

[57] ABSTRACT

A deceleration-sensitive switch adapted to be closed by movement of a weight at the time of a collision. An electromagnet normally keeps the weight away from the switch to open it. The electromagnet is supplied with a current signal varying in magnitude with vehicle speed, so as to vary the minimum deceleration above which the weight is released from the electromagnet to close the switch. The current signal is obtained through proper processing of a vehicle speed signal proportional to the rotational speed of a vehicle wheel. In order to compensate for the deviation of the detected vehicle speed from the actual value that would occur when the vehicle wheels are suddenly locked by the brackes, the vehicle speed signal is arranged to decrease at a certain rate during a rapid decrease of the wheel's rotational speed.

9 Claims, 13 Drawing Figures

COLLISION SENSOR FOR MOTOR VEHICLE SAFETY DEVICE

This invention relates to motor vehicle safety devices and, more particularly, to an improved collision sensor including a deceleration-sensitive switch whose minimum deceleration rendering the switch closed is varied with vehicle speed so as to prevent undesired actuation of the safety device.

Heretofore, many types of collision sensors have been proposed for actuation of motor vehicle safety devices. In certain of them, a deceleration-sensitive switch is provided which includes a weight adapted to move the switch to a closed position at the time of a collision. Usually, the weight employed has a relatively small mass so that in the case of a collision at high speeds it can close the switch within approximately ten milliseconds to secure safely protection of vehicle occupants from injuries. However, there is a tendency for switches of this type to be closed by a small impact which would result from a slight collision such as one occurring at relatively low vehicle speed, although, in this case, actuation of the safety device is undesired.

To eliminate this difficulty, it has been proposed that the minimum deceleration $G_s$ above which the switch is designed to be closed is varied with vehicle speed. That is, for lower vehicle speeds, the minimum deceleration $G_s$ is increased to prevent undesired actuation of the safety device, while, for higher vehicle speeds, the $G_s$ is lowered to provide for quick response to a collision condition. As will be appreciated by those skilled in the art, this scheme of varying the minimum deceleration $G_s$ is realized through the provision of a permanent magnet and an electromagnet both acting to normally keep the weight in a position opening the switch, the electromagnet being supplied with a current signal of a magnitude dependent upon vehicle speed from an electronic circuit for converting the wheels' rotational speed into the current signal. However, there exists problem that if a slippage occurrs between the tires and the road, the detected vehicle speed tends to deviate from the actual value. Especially, in such a case that the wheels are suddenly locked by the brakes during travelling on a slippery road, the detected vehicle speed becomes far lower than the actual value. Since, in this condition, the switch is arranged to have a higher minimum deceleration $G_s$, there is a likelihood that the switch fails to actuate the safety device at the time of a collision.

Therefore, it is an object of the present invention to provide an improved collision sensor for a motor vehicle safety device with a view of overcoming the above-stated disadvantages.

Another object of the present invention is to provide an improved collision sensor whose minimum deceleration rendering the safety device actuated is varied with vehicle speed.

It is a further object of the present invention to provide an improved collision sensor that insures actuation of the safety device upon sensing of a collision condition even when a slippage of the wheels occurs causing a deviation of the detected vehicle speed from the actual value.

These and other objects will be readily apparent from the following description of the invention when read in conjunction with the accompanying drawings, in which.

Figure 1:
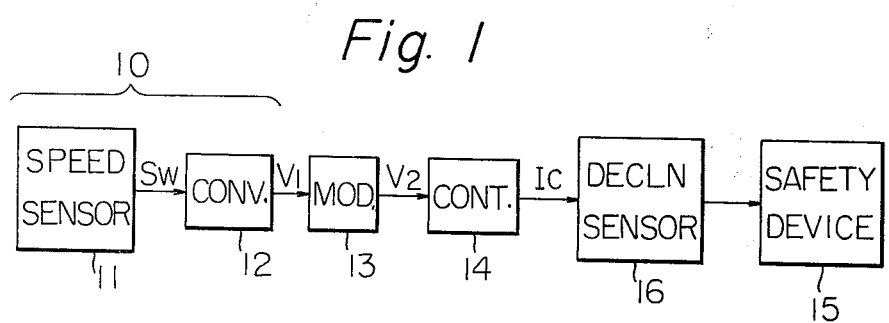
FIG. 1 is a block diagram of a collision sensor embodying the invention.
Figure 2:
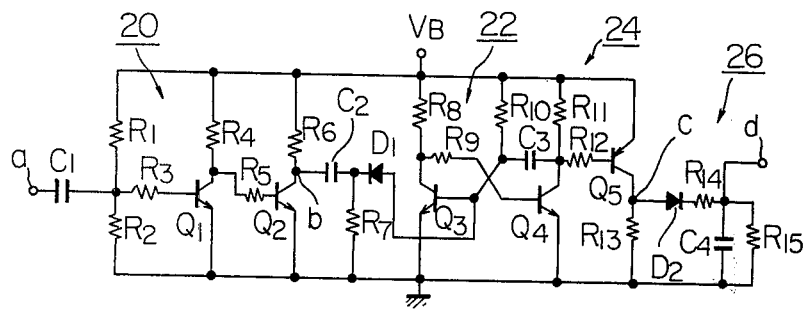
FIG. 2 is a circuit diagram of the frequency-voltage conversion circuit of FIG. 1.
Figure 4:
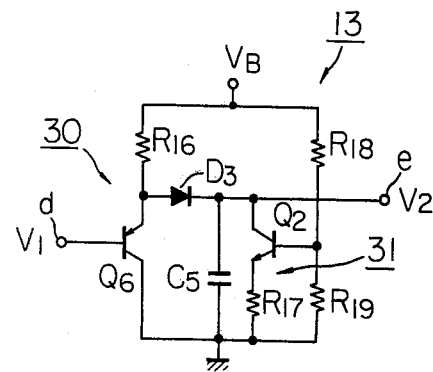
Figure 6:
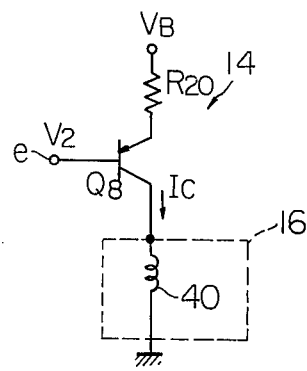
Figure 7:
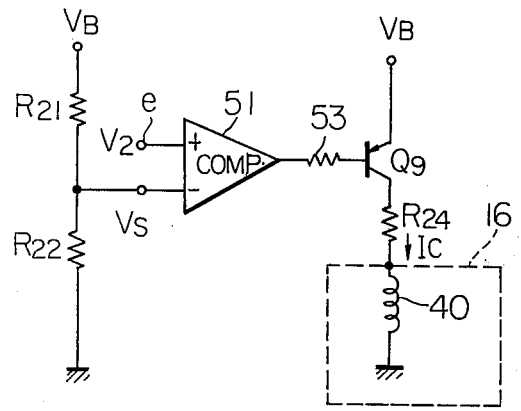

FIGS. 3(a) to (d) show the waveforms appearing at various points in the circuit of FIG. 2;

FIG. 4 is a circuit diagram of the modulator circuit of FIG. 1;

FIGS. 5(a), (b) and (c) show the actual vehicle speed, the input voltage and output voltage of the circuit of FIG. 4, respectively;

FIG. 6 is a circuit diagram of the control circuit of FIG. 1;

FIG. 7 is a modification of the control circuit; and

Figure 8:
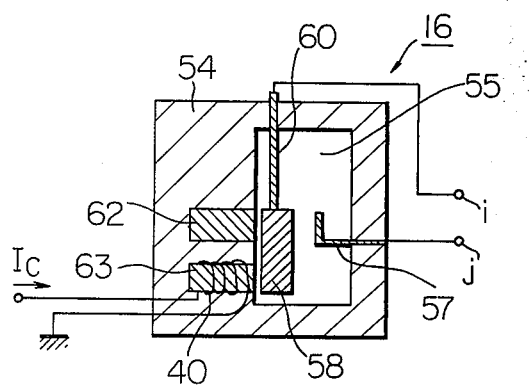

FIG. 8 is a diagrammatic sectional view of the deceleration sensor of FIG. 1.

A simplified block diagram illustrating the overall arrangement of the collision sensor according to the invention is shown in FIG. 1.

The collision sensor includes a vehicle speed detector 10 which comprises a speed sensor 11 and a frequency-voltage conversion circuit 12. The speed sensor 11 may be of any conventional type capable of generating an a.c. signal $S_w$ with a frequency proportional to the rotational speed of a vehicle wheel. The frequency-voltage conversion circuit 12 functions to respond to the a.c. signal $S_w$ from the sensor 11 to generate an analog voltage $V_1$ that is proportional to the rotational speed. The analog signal $V_1$ is supplied from the conversion circuit 12 to a modulator circuit 13. The modulator circuit 13, in response to the analog signal $V_1$, generates a vehicle speed signal $V_2$ which follows the $V_1$ during an increase and slow decrease of $V_1$. However, when the $V_1$ rapidly decreases at more than a predetermined rate, the $V_2$ is arranged to decrease at a certain rate of this rate of decrease is maintained during such decrease of $V_1$. Thus, if, at sudden braking, the wheels are locked by the brakes causing a rapid decrease in the $V_1$, the $V_2$ exhibits the certain rate of decrease which is arranged to approximately equal that decrease of the actual vehicle speed.

Connected to the modulator circuit 13 is a control circuit 14 which generates an current signal $I_c$ dependent upon the vehicle speed signal $V_2$ supplied from the modulator circuit 13. The current signal $I_c$ is varied by the control circuit 14 to change with the minimum deceleration above which a safety device 15 is to be actuated, in accordance with vehicle speed. The control circuit 14 is further connected to a deceleration sensor 16 including a switch (not shown in FIG. 1). The switch is normally kept in an open position but is immediately rendered closed when a collision takes place. The deceleration sensor 16 further includes an electromagnet or a combination of an electromagnet and a permanent magnet (not shown in FIG. 1) for normally maintaining the switch in the open position. The electromagnet is supplied with the current signal $I_c$ so as to vary a force exerted on the switch thereby changing the minimum deceleration above which the safety device 15 is to be actuated. The safety device 15 is connected to the switch of the deceleration sensor 16 for actuation of a gas bag or other shock absorbing means comprising the device 15 at the time of a collision.

Figure 3:
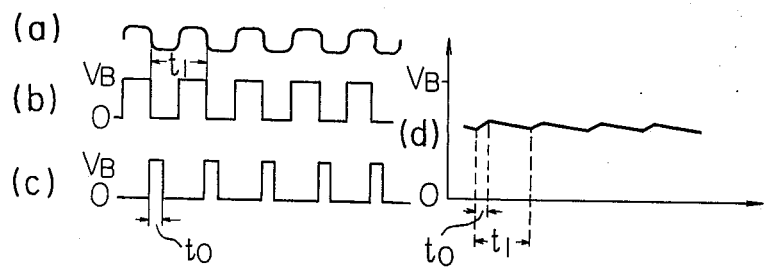

In FIG. 2, there is shown a typical circuit arrangement of the frequency-voltage conversion circuit 12 shown in FIG. 1. Alphabetical character $a$ designates an input end of the conversion circuit 12 which is connected to the speed sensor 11 (shown in FIG. 1) so as to be supplied with the a.c. signal $S_w$ therefrom. The input end $a$ is connected to a Schmitt trigger circuit 20 of a conventional construction and comprises transistors $Q_1$ and $Q_2$ of the NPN type, resistors $R_1$ through $R_6$ and a capacitor $C_1$, the collector of the transistor $Q_2$ forming an output $b$. As is well known, the Schmitt trigger circuit 20 functions to respond to the a.c. signal $S_w$, the waveform of which is shown in FIG. 3($a$), to generate a rectangular wave signal having a repetition period $t_1$, the waveform of which is also shown in FIG. 3($b$). However, if the speed sensor 11 is constructed in a way to generate a rectangular wave signal having a repetition period dependent upon the rotational speed of a vehicle wheel, it will be appreciated that the Schmitt trigger circuit 20 may be omitted, of course.

The rectangular waveform output derived from the transistor $Q_2$ is supplied to a monostable multivibrator 22 of a conventional construction and comprises transistors $Q_3$ and $Q_4$ of the NPN type, a diode $D_1$, resistors $R_7$ through $R_{11}$ and capacitors $C_2$ and $C_3$. The monostable multivibrator 22 is connected to an invertor 24 comprising a transistor $Q_5$ and resistors $R_{12}$ and $R_{13}$, with the collector of the transistor $Q_5$ forming an output $c$ of the invertor. The invertor 24 serves to reduce the output impedance of the monostable multivibrator 22. The pulse signal at $c$, as is shown in FIG. 3($c$), is of a width $t_o$ that is dependent upon the values of the resistor $R_{10}$ and the capacitor $C_3$.

The pulse signal is further supplied to a filter circuit 26 comprising a diode $D_2$, resistors $R_{14}$ and $R_{15}$ and a capacitor $C_4$. Indicated at $d$ is the output of the frequency-voltage conversion circuit 12 which is connected to the point between the resistor $R_{14}$ and the capacitor $C_4$. FIG. 3($d$) illustrates the waveform appearing at $d$ which is produced through charging and discharging of the capacitor $C_4$. Under normal condition, the fact that the amount of electric charge flowing into the point $d$ is equal to that flowing therefrom yields the following equation:

$$\frac{V_B - V_1}{R_{14}} t_o = \frac{V_1}{R_{15}} t_1$$

where $V_B$ represents supply voltage.
This equation is equivalent to:

$$V_1 = V_B / \frac{R_{14} \cdot t_1}{R_{15} \cdot t_o} + 1$$

In the above equation, it is understood that the values of the resistors $R_{14}$ and $R_{15}$ and the time $t_o$ are constant. Thus, the equation can be approximated by:

$$V_1 = \alpha \frac{1}{t_1} = \alpha f_1$$

where $\alpha$ represents a constant of proportionality. Accordingly, it will be appreciated that the d.c. voltage $V_1$ is substantially proportional to the vehicle speed $v_w$. In this connection, care must be exercised to make appropriate selection of the resistors $R_{14}$ and $R_{15}$ and the capacitor $C_4$ so that the analog voltage $V_1$ makes satisfactorily quick response to the vehicle speed $v_w$.

In FIG. 4, there is shown a typical example of the modulator circuit 13 of FIG. 1. This modulator circuit 13 generally comprises an input impedance converter 39 and a constant-current discharge circuit 31. The impedance converter 30 includes a transistor $Q_6$ of the PNP type with its emitter connected to the supply voltage $V_B$ through a resistor $R_{16}$ and with its collector grounded. The base of the transistor $Q_6$ forms an input end "d" of the modulator circuit 13 to which is applied the analog signal $V_1$ proportional to the vehicle speed.

The constant-current discharge circuit 31 includes a transistor $Q_7$ of the NPN type with its collector connected to the emitter of $Q_6$ through a diode $D_3$. A capacitor $C_5$ is provided which connects the collector $Q_7$ to the ground. The transistor $Q_7$ is connected at its emitter to the ground through a resistor $R_{17}$ and at its base to the supply voltage and to the ground through resistors $R_{18}$ and $R_{19}$, respectively. The output voltage $V_2$ of the modulator circuit 13 is obtained from a terminal $e$ leading from the collector of the transistor $Q_7$.

Under a normal condition, the capacitor $C_5$ is charged to a level approximately equal to the input voltage $V_1$. For example, when the voltage $V_1$ increases tp $V_1'$ along the line 33 shown in FIG. 5($b$), a current flows through the resistor $R_{16}$ and the diode $D_3$, charging the capacitor $C_5$ to the same level as $V_1'$, as is seen in FIG. 3($c$). In order that the charging voltage appearing at the positive terminal of the capacitor $C_5$, i.e., the output voltage $V_2$ might follow the input voltage $V_1$ quickly, it is important to employ the resistor $R_{16}$ of relatively small value to provide a reduced time constant.

Figure 5:
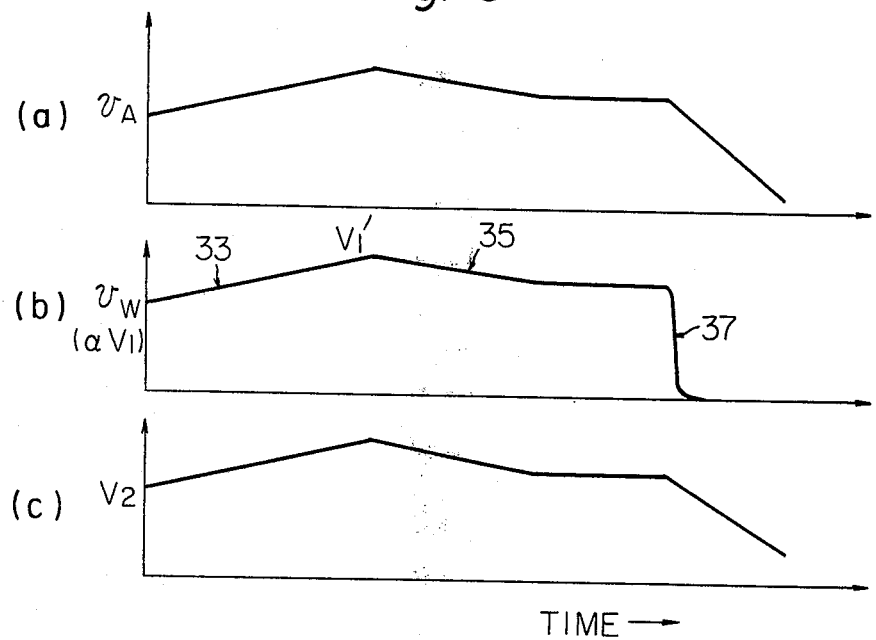

On the other hand, as the input voltage $V_1$ gradually decreases along the line 35 shown in FIG. 5($b$), the output voltage $V_2$ attempts to follow the input voltage and drops to the same voltage as $V_1$, as is seen in FIG. 5($c$). This voltage drop is brought about by the discharging of the capacitor $C_5$ through the constant-current discharge circuit 31. At this time, the diode $D_3$ functions to prevent flow therethrough of the discharging current. However, if the input voltage $V_1$ rapidly decreases, as shown by the line 37, the output voltage $V_2$ cannot follow the input voltage and accordingly decreases at a certain rate dependent upon the characteristics of the constant-current discharge circuit 31. In the preferred embodiment of the invention, the rate of decrease is selected to equal the rate of decrease of vehicle speed, i.e., the deceleration which is believed to occur when the brakes are suddenly applied during travelling on a relatively slippery road. The value of the deceleration lies in the range of 0.1 to 0.3 G (G: gravitational acceleration). Thus, it will be appreciated that the output voltage $V_2$ increases and decreases in substantially the same manner as the actual vehicle speed does, as will be readily apparent from comparison between FIGS. 5($a$) and ($c$).

In FIG. 6, there is shown an example of the control circuit 14 forming part of the collision sensor according to the present invention. The control circuit 14 includes a transistor $Q_8$ of the PNP type with its base connected to the terminal $e$ of the modulator circuit 13 shown in FIG. 4. The transistor $Q_8$ has its emitter connected to the supply voltage $V_B$ through a resistor $R_{20}$ and its collector connected to a coil 40 which forms part of the electromagnet included in the deceleration sensor 16 (shown in FIG. 8). As will be understood, the current $I_c$ flowing from the collector of $Q_8$ into the coil 40 is inversely proportional to the input voltage $V_2$.

A modified form of the control circuit 14 is shown in FIG. 7. Although, in the embodiment of FIG. 6, the output current $I_c$ varies continuously as the input voltage $V_2$ varies, the control circuit shown in FIG. 7 is designed to selectively keep the current $I_c$ at two predetermined values in accordance with the voltage $V_2$. The control circuit 14 as shown includes a voltage divider comprising resistors $R_{21}$ and $R_{22}$ which are arranged to provide a reference voltage $V_s$ at the point 50 therebetween. The reference voltage $V_s$ corresponds to a certain vehicle speed which, in this embodiment, lies in the range of 5 to 30 km/h. The point 50 is connected to one input terminal of a comparator 51, the other of which is connected to the terminal $e$ of the modulator circuit 13 so as to be supplied with the vehicle speed signal $V_2$ therefrom. The comparator 51 functions to compare the two voltages $V_2$ and $V_s$ and to provide an output signal when $V_s$ is greater than $V_2$. The output of the comparator 51 is connected through a resistor 53 to the base of a transistor $Q_9$ of the PNP type, the collector thereof being connected through a resistor $R_{24}$ to the coil 40 of the electromagnet provided in the deceleration sensor 16. Thus, when $V_s$ is greater than $V_2$, the comparator 51 renders the transistor $Q_8$ conductive, thereby energizing the coil 40. On the other hand, when $V_s$ is smaller than $V_2$, the transistor $Q_8$ remains non-conductive, causing no output current $I_c$ to flow through the coil 40.

In FIG. 8, there is shown a typical arrangement of the deceleration sensor 16 according to the invention. The deceleration sensor 16 includes a generally cylindrical body 54 of non-magnetic, electrically insulating material having a chamber 55. Within the chamber 55 are provided a contact 57 extending thereinto through the body 54 and a weight 58 of magnetic material, the contact and the weight comprising a switch for actuating the safety device 15 (shown in FIG. 1). The weight 58 is suspended within the chamber 55 by a conductive wire 60 which leads to a terminal $i$. Another terminal $j$ is provided leading to the contact 57.

A permanent magnet 62 and an electromagnet 63 are provided in a body 54 to normally keep the weight 58 away from the contact 57. The electromagnet 63 includes the coil 40 having one end grounded and the other connected to the control circuit 14.

Let it be assumed that forces $F_1$ and $F_2$ are exerted upon the weight 58 having a mass $m$ by the permanent magnet 62 and the electromagnet 63, respectively. In this case, it will be appreciated that the weight 58 remains in the position shown until the deceleration exceeds $F_1 + F_2/m$. When the deceleration sensor 16 is subjected to a deceleration greater than $F_1 + F_2/m$, the weight 58 moves in a right-hand direction as viewed in FIG. 8, coming into electrical contact with the contact 57, so that the safety device 15 is actuated.

In this connection, it should be noted that the force $F_2$ exerted by the electromagnet 63 is of magnitude dependent upon the current $I_c$ supplied from the control circuit 14. If the coil 40 is wound in such a manner that the $F_2$ increases as the $I_c$ increases, then, since the $I_c$ is arranged to be inversely proportional to the vehicle speed as has been explained in conjunction with the embodiment of FIG. 6, the value $F_1 + F_2/m$ decreases as the vehicle speed increases. Where the arrangement of FIG. 7 is employed, the $F_1 + F_2/m$ is kept at a small value during greater than the certain vehicle speed determined by the resistors $R_{21}$ and $R_2$ while, on the other hand, the $F_1 + F_2/m$ is kept at a large value during lower than the certain vehicle speed. However, if the control circuit 14 is designed to produce an output current $I_c$ proportional to the vehicle speed signal $V_2$, as different from the embodiments of FIGS. 6 and 7, then it is necessary to modify the deceleration sensor 16 so that the direction of the force $F_2$ exerted upon the weight 58 by the electromagnet 63 is reversed.

Thus, it will be appreciated that the minimum deceleration above which the deceleration-sensitive switch is closed is varied with vehicle speed in a manner to prevent undesired actuation of the safety device.

What is claimed is:

1. A collision sensor for sensing a collision condition of the motor vehicle to actuate a safety device mounted thereon, said sensor comprising:
    a normally open switch for actuating said safety device when closed, a weight member of magnetic material for moving said switch to a closed position in response to inertial force of deceleration, magnetic means for producing a magnetic biasing force for normally biasing said weight member in the normally opened position, and
    means for varying said magnetic biasing force according to vehicle speed so that said biasing force is reduced as the vehicle speed increases, said means for varying said magnetic biasing force comprising:
    means for generating a first signal of a magnitude proportional to the rotational speed of a vehicle wheel;
    means for generating a second signal responsive to said first signal, the magnitude of said second signal being arranged to follow that of said first signal during an increase and a slow decrease in magnitude of said first signal but to decrease at a predetermined rate during a rapid decrease in magnitude of said first signal;
    means for generating a third signal of a magnitude controlled by said second signal, said third signal being received by said magnetic means, for varying said magnetic biasing force, whereby said magnetic member is movable to its switch closing position only at the time the inertial force is of such magnitude as to overcome the magnetic biasing force.

2. A collision sensor as claimed in claim 1, in which the predetermined rate of decrease in magnitude of said second signal is arranged to equal the rate of decrease of the vehicle speed occurring when the vehicle wheels are suddenly locked by the brakes during travelling on a slippery road.

3. A collision sensor as claimed in claim 2, in which said rate of decrease of the vehicle speed lies in the range of 0.1 to 0.3 G (G: gravitational acceleration).

4. A collision sensor as claimed in claim 1, in which said means for generating a second signal comprises an input impedance converter and a constant-current discharge circuit.

5. A collision sensor as claimed in claim 4, in which said input impedance converter includes a transistor of the PNP type with its emitter connected to the supply voltage through a resistor and with its collector grounded, the base of said transistor forming an input of said converter.

6. A collision sensor as claimed in claim 5, in which said constant-current discharge circuit includes a transistor of the NPN type with its emitter grounded through a resistor and with its base connected to the supply voltage and to the ground through respective resistors, a diode connected between the emitter of said transistor of the PNP type and the collector of said transistor of the NPN type in a direction to prevent current flow from the latter to the former, and a capacitor connected between the collector of said transistor of the NPN type and the ground, the collector of said transistor of the PNP type and the ground, the collector of said transistor of the NPN type forming an output of said discharge circuit.

7. A collision sensor as claimed in claim 1, in which said means for generating a third signal comprises a transistor of the PNP type with its emitter connected to the supply voltage through a resistor and with its collector connected to said magnet means, the base of said transistor forming an input of said means for generating a third signal.

8. A collision sensor as claimed in claim 1, in which said means for generating a third signal comprises a voltage divider comprising two serially connected resistors, a comparator having two inputs, one of which is connected to the point between said two resistors, the other of which forming an input of said means for generating a third signal, and a transistor of the PNP type with its base connected to the output of said comparator through a resistor and with its emitter connected to the supply voltage, the collector of said transistor being connected to said magnet means.

9. A collision sensor as claimed in claim 8, in which said two serially connected resistors are arranged to provide at a point therebetween a voltage corresponding to a vehicle speed ranging from 5 to 30 km/h.

* * * * *